A. W. STARCK.
SWINGING HOT SAW FOR ROLLING MILLS.
APPLICATION FILED JAN. 3, 1910.
1,010,527.
Patented Dec. 5, 1911.
2 SHEETS—SHEET 1.
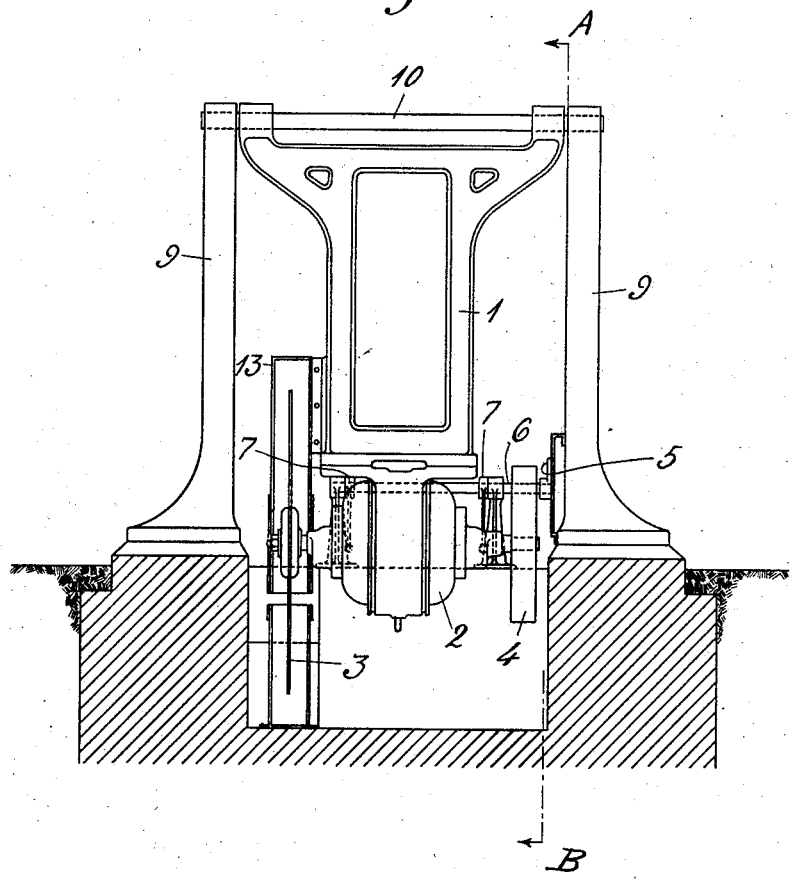
Fig:1
WITNESSES
W. P. Burke
John A. Percival
INVENTOR
August Wilhelm Starck.
By
Atty A. W. STARCK.
SWINGING HOT SAW FOR ROLLING MILLS.
APPLICATION FILED JAN. 3, 1910.
1,010,527.
Patented Dec. 5, 1911.
2 SHEETS—SHEET 2.
Fig: 2
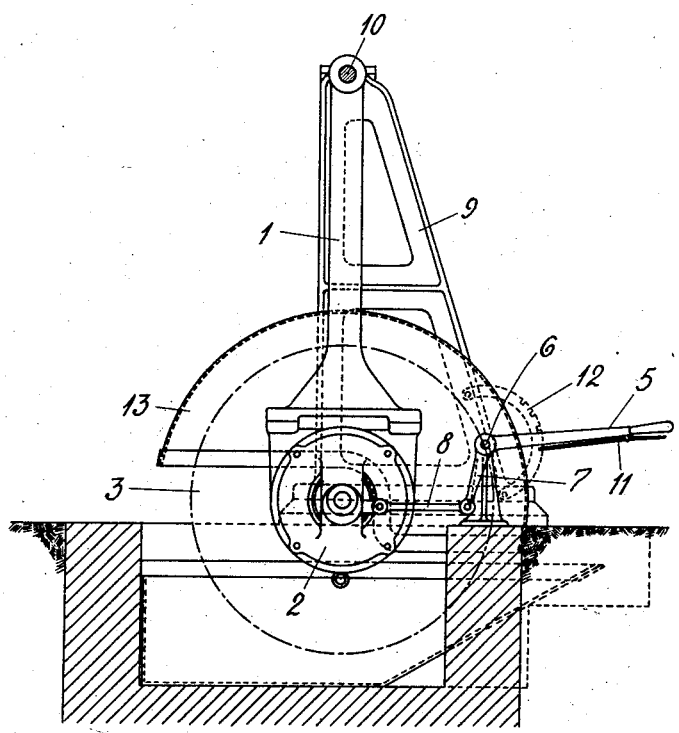
WITNESSES
INVENTOR
August Wilhelm Starck
By
Att'y

UNITED STATES PATENT OFFICE.

AUGUST WILHELM STARCK, OF SKÖFDE, SWEDEN.

SWINGING HOT-SAW FOR ROLLING-MILLS.

1,010,527.  Specification of Letters Patent.  Patented Dec. 5, 1911.

Application filed January 3, 1910. Serial No. 536,189.

*To all whom it may concern:*

Be it known that I, AUGUST WILHELM STARCK, engineer, subject of the King of Sweden, residing at Skolgatan 14, at Sköfde, in the Kingdom of Sweden, have invented certain new and useful Improvements in Swinging Hot-Saws for Rolling-Mills, of which the following is a specification.

The present invention relates to an electrically driven swinging saw, which is distinguished from electrically driven swinging saws before known in that no transmission arrangement, as belts, etc., is required for transmitting the power from the electric motor to the saw, as the same is directly connected with the shaft of the electric motor.

The invention is illustrated on the accompanying drawings, on which is shown as an example a swinging saw, constructed according to the present invention.

Figure 1 is a front elevation and Fig. 2 is a vertical section after the line A—B in Fig. 1.

On a shaft 10, which turns in bearings on the supports 9, is a pendulum arm 1, hanging. To the lower end of said arm is an electric motor 2 fastened, especially designed for this purpose. One end of the motor shaft carries the circular saw 3, and the other end carries a flywheel 4 in order to partly balance the uneven load. The regulation of the movements of the saw against and from the work is done with the handle 5 which is fastened on the rock shaft 6, and the motion is transmitted to the swinging arm 1, carrying the motor and the saw through arms 7 fastened on the same shaft and further through the links 8, connecting said arms with the ends of the motor. The handle 5 is provided with a suitable locking arrangement, as for example a spring latch 11, which catches into notches on a segment 12. With this arrangement, the motor with the saw can be put in any desired side position before the sawing. The regulation can also be done in some other way. Especially for saws of larger sizes it might be necessary to use a separate motor with gearing arrangement, a steam- or hydraulic cylinder, etc.

13 is a guard.

As the saw is directly coupled to the motor shaft, belting is unnecessary, and hereby not only a great disadvantage, connected with other swinging saws, is removed, but also the working expenses have been considerably reduced. A swinging saw of the present design will therefore, not only in manufacturing but also in working expenses be much cheaper than any other swing saw of the same capacity.

Having thus described my invention, I declare, that what I claim is:—

In swinging hot saws for rolling mills, the combination with a pendulum frame, of an electric motor supported in the lower end of said frame, a circular saw directly mounted on the rotating shaft of said motor, means for swinging said frame, said means consisting of arms mounted on a shaft and controlled by a handle, and links at both ends of the motor connected to said arms and to said frame.

In witness whereof I have hereunto set my hand in presence of two witnesses.

AUGUST WILHELM STARCK.

Witnesses:
V. H. v. SCHANTZ,
A. HARTWIG.

Copies of this patent may be obtained for five cents each, by addressing the "Commissioner of Patents, Washington, D. C."